(12) United States Patent
Doron

(10) Patent No.: US 7,768,552 B1
(45) Date of Patent: Aug. 3, 2010

(54) DIGITAL STILL CAMERA WITH STILL AND MOTION IMAGE CAPABILITIES

(75) Inventor: Amir Doron, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 401 days.

(21) Appl. No.: 09/360,419

(22) Filed: Jul. 23, 1999

(51) Int. Cl.
 *H04N 5/225* (2006.01)
(52) U.S. Cl. ............. 348/220.1; 386/117; 386/121; 386/107; 386/109; 386/112
(58) Field of Classification Search ........... 348/220.1, 348/231.99, 552, 207.1; 358/906, 909.1; 386/117, 121, 107, 109, 112, 120
See application file for complete search history.

(56) References Cited

U.S. PATENT DOCUMENTS

| | | | |
|---|---|---|---|
| 4,714,966 A | 12/1987 | Saito et al. | 358/335 |
| 5,153,730 A | 10/1992 | Nagasaki et al. | 358/209 |
| 5,218,452 A | 6/1993 | Kondo et al. | 358/342 |
| 5,436,656 A | 7/1995 | Soga et al. | 348/220 |
| 5,440,343 A * | 8/1995 | Parulski et al. | 348/316 |
| 5,444,483 A | 8/1995 | Maeda | 348/231 |
| 5,659,654 A | 8/1997 | Nagasawa et al. | 386/120 |
| 5,712,680 A | 1/1998 | Heida | 348/220 |
| 5,734,424 A | 3/1998 | Sasaki | 348/222 |
| 5,751,350 A | 5/1998 | Tanaka | 348/231 |
| 5,751,445 A | 5/1998 | Masunaga | 358/426 |
| 6,038,257 A * | 3/2000 | Brusewitz et al. | 375/240.21 |
| 6,148,031 A * | 11/2000 | Kato | 375/240.13 |
| 6,167,473 A * | 12/2000 | Kho | 710/107 |
| 6,223,190 B1 * | 4/2001 | Aihara et al. | 715/513 |
| 6,297,870 B1 * | 10/2001 | Nanba | 355/18 |
| 6,366,360 B2 | 4/2002 | Ejiri et al. | |
| 6,853,378 B2 | 2/2005 | Enokida et al. | |
| 2002/0012051 A1 * | 1/2002 | Mizoguchi | 348/220 |

FOREIGN PATENT DOCUMENTS

| | | |
|---|---|---|
| JP | 6-315105 | 11/1994 |
| JP | 8-205076 | 8/1996 |
| JP | 9-294225 | 11/1997 |
| JP | 10-164492 | 6/1998 |
| JP | 11-177915 | 7/1999 |
| WO | WO99/23817 | 5/1999 |

OTHER PUBLICATIONS

"Digital Camera for Dynamic and Still Images Using Dual Mode Software Processing" Publivcation No. JP10126796 A 19980515 EW199830 H04N9/04 012pp; Applicant: Eastman Kodak Co., Priority US19960712692, 19960912.

"Image Pickup Device and Recording Medium Read by Computer" Publication No. JP11075097 A 19990316 DW199921 H04N5/225 015pp; Applicant: Canon KK; Priority JP19970231629 19970828.

* cited by examiner

*Primary Examiner*—Lin Ye
*Assistant Examiner*—Yogesh K Aggarwal

(57) ABSTRACT

A camera has an image sensor mounted in a housing for receiving light and generating output signals representative of an image. A circuit processes the output signals in response to actuation of a shutter button mounted in the housing. A control circuit is connected to the processing circuit for selectively generating a first sequence of high resolution still image files or a second sequence of low resolution still image files and for executing firmware to convert the second sequence into a motion video sequence.

12 Claims, 4 Drawing Sheets

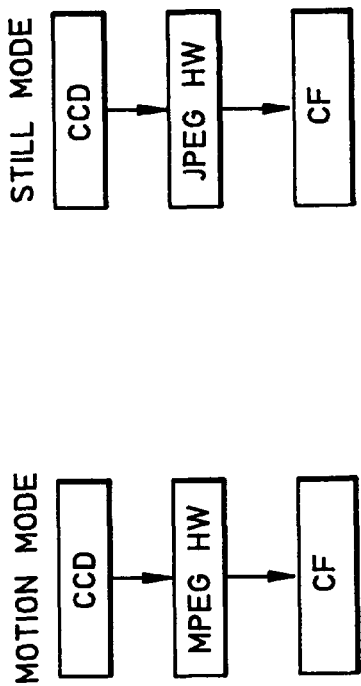
FIG. 3 PRIOR ART
FIG. 4 PRIOR ART
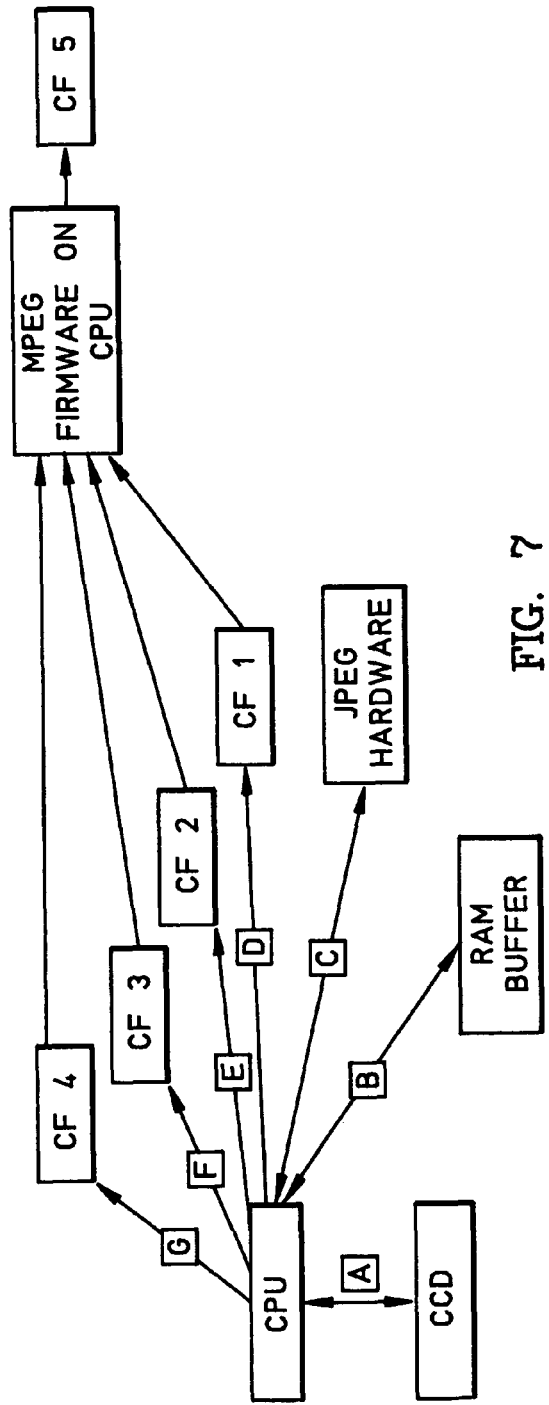
FIG. 7

DIGITAL STILL CAMERA WITH STILL AND MOTION IMAGE CAPABILITIES

BACKGROUND OF THE INVENTION

The present invention relates to electronic still photography, and more particularly, to a digital still camera (DSC) with combined still and motion image capabilities.

DSCs are rapidly gaining in popularity with consumers as an alternative to conventional still cameras that use silver halide film. The number of pixels in the color electronic still images has increased to the point where picture detail and clarity are acceptable to consumers. Digital still images can be selected and enhanced before printing with home photo album software, eliminating the cost and expense of purchasing and developing traditional camera film. Advancements in ink jet and laser printer technology, inks and paper allow color prints to be generated from digital still images that rival the quality of silver halide color prints. Digital still images taken with a DSC can be cut and pasted into various word processing and other publishing applications used on personal computers (PCs). In addition, the digital still images can be used in web pages and can be transmitted over the Internet. From an environmental standpoint, electronic still photography is attractive because it reduces the need for silver halide film manufacture as well as the handling and disposal of chemical developer solutions.

With cameras designed for use by large numbers of consumers moving into the digital domain it is becoming feasible to offer users both still images and moving images of the same scene with the same camera. The hardware and software used by DSCs and video cameras is very similar except in the way the images from the CCD are stored. FIGS. 1 and 2 illustrate the hardware for the image capture and compression of a conventional video camera and a conventional DSC, respectively. The boxes in each of these figures labeled CF denote a compact flash card memory.

A conventional NTSC format motion video camera takes around thirty images per second and stores them in a solid state memory before recording the same on tape. Because of the massive amount of data that must be stored in providing video motion images, the data must be compressed. One compression algorithm for motion video that has attained widespread use is the Moving Pictures Expert Group (MPEG) standard for handling video encoding and decoding. In order to display compressed video information which has been stored it must first be de-compressed to provide decompressed video information. The decompressed video information is then provided in a bit stream to a suitable display. The bit stream of video information is typically stored in a plurality of memory storage locations corresponding to pixel locations on the display screen. The stored video information is generally referred to as a bit map. The video information required to present a single screen of information on the display is called a frame. The goal of most video systems is to quickly and efficiently decode compressed video information so as to provide realistic motion images.

A conventional DSC takes only a single image at a time, usually of a much higher resolution than the images taken by a conventional video camera. The DSC stores the single image in memory using a still image compression algorithm. One compression algorithm for digital still images that has attained widespread use is the Joint Pictures Expert Group (JPEG). In a conventional DSC, once the "shutter" button is depressed, and after a picture has been "taken", the DSC electronics usually takes several seconds to render the picture internally, compress it, and then store it in the camera's internal memory. After the compression and storage processes have been completed, the DSC is ready to take another picture. Since most conventional DSCs currently require delays between the taking of successive pictures it is difficult to shoot fast moving objects. Some existing DSCs can take several successive frames at once. They have the capability of taking successive pictures of a moving object and replaying them in sequence, although the motion images are akin to stop motion, i.e. they are jerky and unrealistic, as opposed to video motion images replayed from a de-compressed MPEG format.

If one desires to have a DSC create a motion video segment it is difficult to keep up with the thirty frames per second required to provide motion that is not jerky and unrealistic. A conventional video camera employs significant hardware dedicated to performing fast compression of sequential images. A conventional DSC on the other hand has circuitry designed to perform fast compression of a single high resolution image in order not to introduce an unacceptable delay in the ability to take successive still pictures.

In the past, DSCs have been commercially available that offer a motion capture mode. Typically they implement a parallel architecture that offers two alternative paths through the hardware as shown in FIGS. 3 and 4. In each case, the image data is stored in a compact flash card memory, denoted CF. This solution is disadvantageous because of the cost of the additional hardware required.

SUMMARY OF THE INVENTION

In accordance with an embodiment of the present invention a camera includes an image sensor mounted in a housing for receiving light and generating output signals representative of an image. A circuit processes the output signals in response to actuation of a shutter button mounted in the housing. A control circuit is connected to the processing circuit for selectively generating a first sequence of high resolution still image files or a second sequence of low resolution still image files and for executing firmware to convert the second sequence into a motion video sequence.

The method of the present invention involves selectively generating a first sequence of high resolution still image files or a second sequence of low resolution still image files and storing the image files in the memory in accordance with a predetermined still image data compression standard. The method further involves selectively retrieving the low resolution image files from the memory. The method further involves converting the low resolution image files to a motion video sequence in accordance with a predetermined motion image data compression standard, the conversion being performed with firmware, and storing the motion video sequence for later display.

BRIEF DESCRIPTION OF THE DRAWINGS

FIGS. 3 and 4 are block diagrams that together illustrate the dual hardware paths of a prior art camera operable in both motion and still modes.

FIG. 7 is a block diagram illustrating the operation of the dual mode camera of FIGS. 5 and 6.

DETAILED DESCRIPTION

Figure 5:
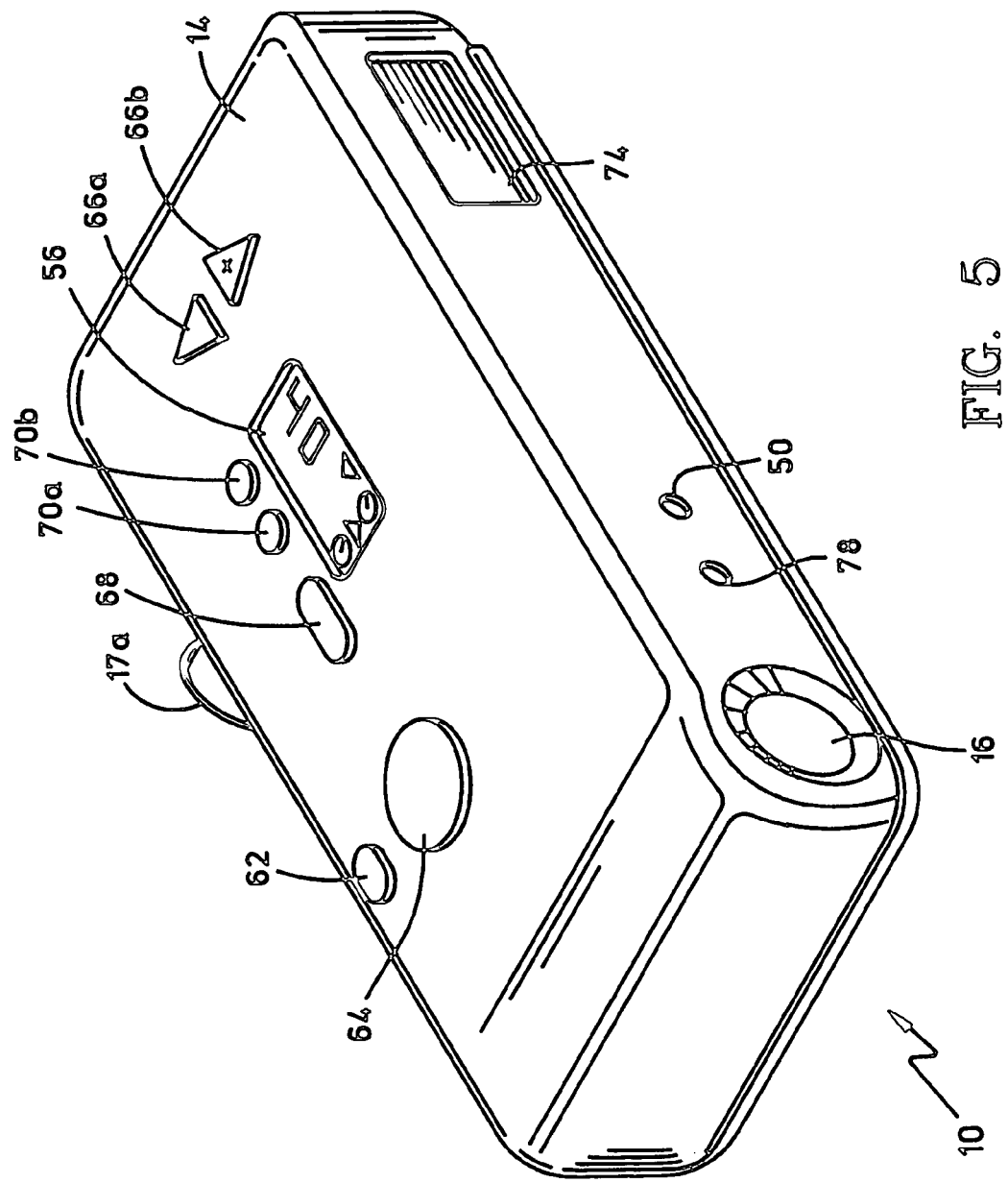
FIG. 5 is a perspective view of a digital camera in accordance with an embodiment of the present invention that has both motion and still mode capabilities.
Figure 6:
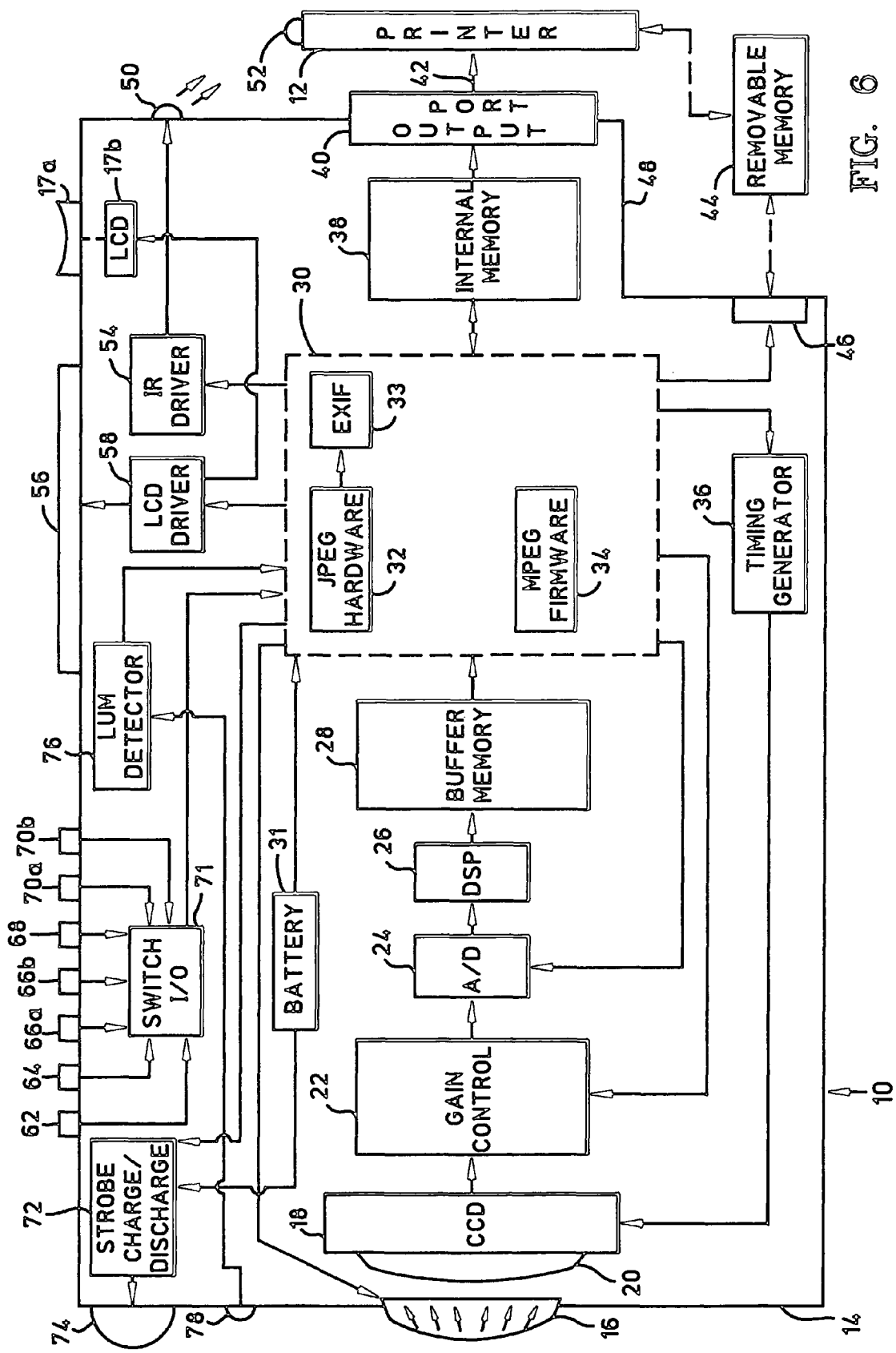
FIG. 6 is a block diagram of the camera of FIG. 5 illustrating its electronic circuitry.

Referring to FIGS. 5 and 6, a digital still camera (DSC) 10 constructed in accordance with an embodiment of the present invention is shown in perspective, and block diagram form, respectively. The camera 10 is capable of transferring digital images to a printer 12 (FIG. 6) via cable connection, removable memory or wireless transmission. Referring to FIG. 5, the camera 10 includes a compact, generally rectangular outer plastic camera body or housing 14 that encloses and supports the operative components of the camera in conventional fashion. A lens 16 is mounted in a forward side wall of the housing 14 for transmitting therethrough light from objects and scenes of interest. An eyepiece 17a (FIGS. 5 and 6) on the rear side wall of the housing 14 forms part of a view finder that allows the user to view objects and/or scenes of interest through the lens 16 or to view electronically recorded images displayed on a small, internal color liquid crystal display (LCD) 17b (FIG. 6). This is accomplished using a pair of pivoting mirrors (not illustrated) inside of the housing 14.

An image sensor 18 (FIG. 6), preferably in the form of an array of charge coupled devices (CCDs), is mounted in the housing 14 behind the lens 16 for receiving the light transmitted through the lens 16. The image sensor 18 generates analog output signals representative of an image of an object or scene of interest. One of the mirrors inside the housing 14 may be pivoted to selectively send light received through the lens 16 to the eyepiece 17a or the image sensor 18. The other mirror may be pivoted to allow the user to view objects and scenes through the lens 16 or to view electronic images on the internal LCD 17b as indicated by the dashed line in FIG. 6.

Referring still to FIG. 6, an array 20 of color filters overlies the forward side of the image sensor 18. The analog signals from the image sensor 18 are serially fed to a gain control circuit 22 the output of which is fed to an analog-to-digital (A/D) converter 24. The digital output of the A/D converter 24 is fed to a digital signal processing (DSP) circuit 26, the output of which is fed through a buffer memory 28 to a control circuit 30. The control circuit 30 receives power from a battery 31 and includes a micro-controller or microprocessor.

Referring still to FIG. 6, light from images and scenes of interest enters the camera 10 through the lens 16 as indicated diagrammatically by the arrows and passes through the color filters 20 before being focused on the active face of the image sensor 18. As is well known in the art, the color filters associated with the various detectors in the CCD array of the image sensor 18 cause the detectors to be sensitive to light of one particular color. By way of example only, the CCD detectors may be configured in a repeating pattern of two by two groups in which the top right detector is sensitive to red light, the top left detector is sensitive to blue light, the bottom right detector is sensitive to green light and the bottom left detector is sensitive to blue light. Each detector of the CCD array accumulates a charge that represents the amount of light in one CCD pixel. A timing generator 36 is coupled between the control circuit 30 and the image sensor 18. The timing generator 36 controls the reading of the array of CCD detectors that make up the image sensor 18 in conventional fashion. The charge accumulated by each CCD detector is serially applied to the input of the gain control circuit 22.

The timing generator 36 (FIG. 6) is capable of periodically flushing the CCD array of the image sensor 18. The gain control circuit 22 implements a conventional correlated double sampling process. This double sampling process accounts for overshoot and undershoot in the outputs of the CCD detectors as the output voltages from each of the detectors in the CCD array are read. The A/D converter 24 converts to digital values the analog voltages read from the CCD detectors after they have been adjusted by the gain control circuit 22.

The DSP 26 (FIG. 6) processes the digital signals from the A/D converter 24 so as to provide a demosaic function, and also performs automatic white balance detection and correction, as well as image sharpening functions in accordance with well known techniques. By way of example, the DSP 26 may be provided in the form of Part No. HD49811TFA commercially available from Hitachi. The output of the DSP 26 is a set of image pixels, each of which represents the color of a particular portion of the image that was captured by the CCD array of the image sensor 18. The entire set of image pixels associated with a complete flushing of the CCD array represents a single image of an object or scene of interest whose "picture" has been "taken" with the camera 10. The single flushing of the CCD array also represents a single frame.

The control circuit 30 (FIG. 6) further includes a hardware JPEG file format conversion component 32. Alternatively, the JPEG file format conversion component 32 could be provided in the form of executable firmware or a combination of hardware and firmware. The JPEG file formal conversion component 32 compresses the output received from the DSP 26 through the buffer memory 28 in accordance with the well known JPEG data compression standard. The image information which is in JPEG format is fed to the EXIF file format component 33 which embeds the JPEG format image information within a file that conforms to the DIGITAL STILL CAMERA FILE FORMAT STANDARD (Version 1.0, Jul. 13, 1995) commonly known as EXIF. The micro-controller of the control circuit 30 may execute firmware to provide the EXIF file format conversion component 33 in lieu of using a dedicated hardware circuit. Alternatively, the EXIF file format conversion component 33 may be a dedicated hardware circuit or a combination of hardware and firmware. The control circuit 30 further includes an MPEG conversion component 34 which is strictly firmware executed by the micro-controller and is not a dedicated circuit.

The camera 10 is designed to selectively operate in a motion mode and a still mode. Referring again to FIG. 6, the portions of the camera 10 represented by the elements 22, 24, 26, 28 and 36 process the output signals from the image sensor as pictures are taken in succession to generate sets of pixels representative of a plurality of images of objects or scenes of interest. The control circuit 30 converts these sets of pixels into a plurality of image files representing images of the objects and scenes of interest. When the camera 10 operates in a still mode, one image file is created for each separate depression and release of the shutter button hereafter described. These sequentially generated image files are in the EXIF file format and represent a sequence of high resolution still pictures taken with the camera 10. These still image files may be temporarily stored in an internal memory 38 and can be conveyed via an output port 40 mounted in the housing 14 of the camera to a cable 42 connected to the printer 12. By way of example, the memory 38 may comprise a non-volatile random access memory ("NVRAM") portion and a volatile RAM portion. Alternatively, it will be understood by those skilled in the art that the cable 42 could be connected to a host in the form of a PC (not illustrated) so that the image files in EXIF format could be further processed in the PC, displayed on its monitor, or downloaded to a printer connected to the PC. Alternatively, the user of the camera 10 may choose to transmit selected image files to the printer 12 via a removable memory 44.

The memory 44 (FIG. 6) is preferably a flash memory card that plugs into a female connector 46 in a receptacle or slot 48 formed in an outer surface of the camera housing 14. A floppy diskette or some other form of removable storage media could be used instead of a flash memory card. As another alternative, the user of the camera 10 may choose to transmit selected still image files to a host such as the printer 12 or a PC by utilizing a wireless data link including an infrared (IR) transmitting device 50 (FIGS. 5 and 6) mounted in an outer surface of the camera housing 14. In such a case, the printer 12 receives the IR radiation in which image data has been encoded via an IR receiver 52 (FIG. 6) mounted on the exterior of the printer housing. The printer 12 has conventional circuitry connected to the IR receiver 52 for decoding the image data from the received IR signals. The IR transmitting device 50 is connected to an IR driver circuit 54 which is controlled by control circuit 30 to transmit the desired image data.

When the camera 10 operates in a motion mode, holding down the shutter button will cause a set of low resolution images to be stored in a separate directory in EXIF format in the removable memory 44 (FIG. 6). The number of low resolution images in the directory is selected so that there will be enough frames per second to deliver substantially non-jerky motion, i.e. approximately thirty frames per second. Stated another way, the sequence of low resolution images is taken at a rate sufficient to ensure realistic real time motion when the motion video sequence is replayed. Since the electronic circuitry of the camera 10 is capable of storing high resolution images, it can also rapidly store a sequence of low resolution images on the removable memory 44 in EXIF file format. Once the shutter button has been released, in order to rapidly replay the stored low resolution images in a manner that will generate motion images they must first be converted to a suitable motion video format such as MPEG. However, it is no longer necessary for the control circuit 30 to keep up with the thirty frames per second rate in real time since the required frames have all been captured and stored on the removable memory 44. Therefore, the firmware MPEG conversion component 34 may be utilized. Special micro-code stored in the non-volatile portion of the internal memory 38 is run by the micro-controller of the control circuit 30 to read in the sequence of low resolution EXIF format still image files from the removable memory 44 and to output a single MPEG file comprised of the motion video. The directory of individual low resolution EXIT format still image files is erased from the removable memory 44 and replaced with the MPEG motion video file. The removable memory can then be loaded into a computer or suitable device for displaying the motion video on a large screen or else the motion video sequence can be played on the camera 10 via its internal LCD 17b. Alternatively, the MPEG motion video file can be transmitted via the wireless transmitter 50 to a host such as a personal computer.

FIG. 7 is a block diagram illustrating the operation of the dual mode camera of FIGS. 5 and 6. The present invention provides a DSC that offers a motion capture mode using a hybrid architecture in which the JPEG hardware component 32 effectively replaces the need for MPEG hardware, with the MPEG functions being carried out, in the case of the motion capture mode, by firmware 34 executed by the micro-controller of the control circuit 30.

Referring still to FIG. 7, in the motion capture mode the CPU takes a succession of digital still pictures using the CCD, RAM buffer and JPEG hardware via pathways A, B and C. These still images are stored in the compact flash card memory via pathways D, E, F and G as CF1, CF2, CF3 and CF4, respectively. The CPU then utilizes firmware code to convert the JPEG data to an MPEG file which is stored in the compact flash card memory as CF5, replacing CF1, CF2, CF3 and CF4. Those of ordinary skill in the art will be familiar with the firmware code required to convert a series of JPEG files to a single MPEG file. Clearly in an actual example the MPEG file would be derived from many more JPEG files than four.

The illustrated embodiment thus provides a DSC with a motion capture mode which does not employ separate JPEG and MPEG hardware circuits. The DSC 10 will not only take conventional high resolution still images, but also can be set to a motion capture mode in which a succession of low resolution images are rapidly taken and stored in a separate directory in the memory 44. Once the motion capture mode operation is completed, the processor in the camera runs special firmware micro-code that reads in the sequence of low resolution JPEG images and outputs a single file that comprises an MPEG motion video segment. The JPEG still images from which the MPEG file was made are erased so as not to unduly consume the available data storage space. The MPEG motion video sequence is stored in the memory 44 for later replay.

Figure 1:
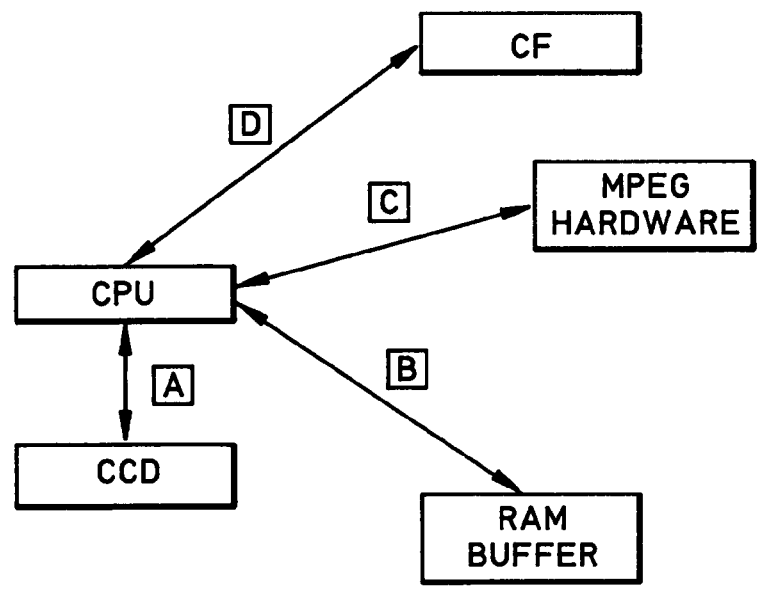
FIG. 1 is a block diagram illustrating a prior art MPEG hardware implementation for generating motion images.
Figure 2:
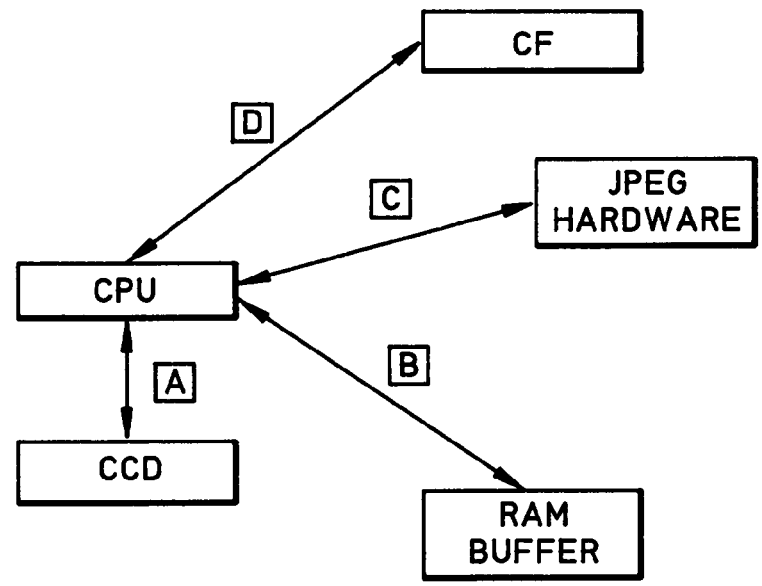
FIG. 2 is a block diagram illustrating a prior art JPEG hardware implementation for generating still images.

An informational display 56 (FIG. 1) is mounted in the top side of the camera housing 14 for viewing by the camera user. The display 56 is preferably an LCD that can display alphanumeric and graphical information. The display 56 is driven in conventional fashion by the LCD driver circuit 58 (FIG. 2) controlled by the control circuit 30. The LCD driver circuit 58 also drives the internal LCD 17b on which recorded images are displayed upon command for viewing through the eyepiece 17a of the camera viewfinder. The display 56 can display a series of menus providing a plurality of command options that can be selected by the user as part of a graphical user interface (GUI) generated by the control circuit 30 using a control program stored in the internal memory 38.

A plurality of manually actuable controls 62, 64, 66a, 66b, 68, 70a and 70b (FIGS. 5 and 6) are mounted in the outer surface of the camera housing 14 so that they can be readily manipulated by the fingers of the user while viewing the informational display 56. By way of example, the manually actuable controls 62, 64, 66a, 66b, 68, 70a and 70b may be of the pushbutton type. The pushbutton 62 it may be depressed to power the camera ON and OFF. The pushbutton 64 may be assigned the shutter button function. When the camera 10 is in its still mode, the pushbutton 64 may be temporarily depressed and released in order take a single still picture. When the camera 10 is in its motion mode, the shutter button 64 may be pushed and held down to take a motion video sequence. The still and motion modes are selected through the GUI. The control circuit 30 generates a sequence of high resolution still image files in response to each momentary actuation of the shutter button 64 and generates a sequence of low resolution still image files in response to the shutter button 64 being actuated and held in an ON condition for a predetermined duration longer than a momentary actuation.

The manually actuable controls 66a and 66b (FIG. 6) may be depressed to scroll up and down through command options displayed on the display 56 to provide the GUI. The pushbutton 68 depressed to select the command option currently highlighted or marked with a cursor. The other push buttons 70a and 70b may be depressed to control other functions such as current strobe mode selection and date/time entry, respectively. The current strobe mode can be selected from a "strobe ON", a "strobe OFF", an "AUTOMATIC" strobe mode, a "RED EYE AUTO" strobe mode and a "RED EYE ON"

strobe modes. Each time the pushbutton 70a is depressed an indication of the current strobe mode can be displayed by the LCD 56. When the desired current strobe mode is displayed, it can be selected and activated in the camera 10, by, for example, depressing the pushbutton 68.

When the camera 10 is in its still mode, the user can depress the strobe pushbutton 70a (FIGS. 5 and 6) with his or her index finger to set a current strobe mode for the current picture taking session once the DSC 10 has been powered ON. The manually actuable controls on the camera housing 14 could include a dial rotatable (not shown) to select one of several different operating modes of operation by placing a pointer on the dial next to the desired mode. These different operating modes may include a still mode, a motion video mode, a review/preview mode, a date/time entry mode, and so forth. The dial would be used for mode selection in lieu of, or as an alternative to, mode selection through the GUI via pushbuttons 66a and 66b. The manually actuable controls 62, 64, 66a, 66b, 68, 70a and 70b interface with the control circuit 30 through a switch input/output (I/O) buffering device 71 (FIG. 6) in conventional fashion.

A conventional strobe charge/discharge circuit 72 (FIG. 6) is connected between the control circuit 30 and a strobe or flash 74 (FIGS. 5 and 6) mounted in a front side of the camera housing 14. The strobe 74 may comprise a gas discharge tube which will flash a bright light on the object or scene of interest when "fired" or energized by the strobe charge/discharge circuit 72 (FIG. 6) in response to a command from the control circuit 30. When the camera 10 is in a still mode, the strobe 74 is fired in accordance with the current strobe mode during a current picture taking session. The strobe charge/discharge circuit 72 receives power from the battery 31. When the DSC 10 is set to an AUTOMATIC strobe mode the ambient luminescence is detected by the control circuit 30 of the DSC 10 each time a picture is taken and the strobe 74 is energized if needed in accordance with pre-programmed luminescence levels. To facilitate this operation, the DSC 10 includes a luminescence detector circuit 76 (FIG. 6) that receives the analog output signal of a suitable luminescence detector 78 (FIGS. 5 and 6) mounted in the front side of the camera housing 14.

The control circuit 30 also causes a series of menus to be displayed on the informational display 56 providing command options that can be selected upon manual actuation of one of the pushbutton controls. Upon manual actuation of certain ones of the pushbutton controls in the appropriate sequence the control circuit 30 causes individual stored still images to be displayed on the small internal LCD 17b so that they can be viewed via the eyepiece 17a (FIGS. 5 and 6) of the viewfinder. Alternatively, the GUI may be used so that the control circuit 30 causes a motion video sequence to be displayed on the LCD 17b. The informational LCD display 56 on top of the camera housing 14 is used solely for displaying alphanumeric data and graphic symbols as part of the GUI.

When the camera 10 is in its still mode, the control circuit 30 causes a markup file to be generated in response to the user's selection of a first predetermined sequence of command options via manipulation of the pushbutton controls. The markup file is created using the GUI. The markup file represents the designation of still image files for further processing. The markup file can include information not only about which pictures are being selected, but how many copies are desired. In addition, the markup file can also include information about image enhancements to be performed on the selected images, such as rotation, cropping, brightening, etc.

Once the still image markup file has been generated, the user can, by following the appropriate menus on the display 56 and actuating the appropriate pushbutton controls, send the designated still image files to the printer 12 via the cable 42, removable memory 44 or IR transmitter 50. Regardless of the mode of data transfer, the printer 12 receives all of the selected image files designated in the markup file and all of the information about quantity and enhancements. The markup file need only be created once by the user, and the information designated therein can then be used in any of the three modes of data transmission, i.e. via cable 42, removable memory 44 or IR transmitter 50.

As part of the GUI the control circuit 30 also causes a menu of various strobe modes to be displayed on the LCD 56, including a "strobe ON" mode, a "strobe OFF" mode, an "AUTOMATIC" strobe mode, a "RED EYE AUTO" strobe mode and a "RED EYE ON" strobe mode. Any single one of these modes can be selected as the default strobe mode using the GUI, e.g. by scrolling with pushbuttons 66a and 66b and depressing pushbutton 68 when the desired strobe mode is either highlighted or marked with a cursor.

Referring again to FIG. 6, when the DSC 10 is powered ON and is switched to its still mode, the control circuit 30 checks the memory 38 in order to determine which strobe mode to go into. Once the DSC 10 has been powered ON, the user can select the strobe mode in two different ways. First, the user can depress the strobe pushbutton 70a on the top of the camera housing 14. Second, the user can select the strobe mode via the GUI using one or more of the pushbutton controls and following the menus shown on the LCD display 56. Using the strobe pushbutton 70a allows the strobe mode to be changed for the current picture taking session only. Once the DSC 10 is powered OFF, the current selected strobe mode is "forgotten". Using the GUI, the user can set a default strobe mode, i.e. from that point forward, the DSC will operate in that strobe mode when in its still mode, and will go into that strobe mode when the DSC is later powered ON in its still mode until the user changes the strobe mode setting via the GUI.

While embodiments of my digital still camera and hybrid still/motion image method have been described and illustrated herein, it should be understood by those skilled in the art that my invention may be varied in both arrangement and detail. Therefore, the protection afforded my invention should only be limited in accordance with the following claims.

I claim:

1. A method of selectively generating still or motion images with a digital camera, comprising the steps of:
   selectively generating a first sequence of high resolution still image files in response to momentary actuation of a shutter button or a second sequence of low resolution still image files in response to actuation of the shutter button for a duration longer than a momentary actuation and storing the image files in the memory in accordance with a predetermined still image data compression standard;
   selectively retrieving the low resolution image files from the memory;
   converting the low resolution image files to a motion video sequence in accordance with a predetermined motion image data compression standard, the conversion being performed with firmware; and
   storing the motion video sequence.

2. The method of claim 1 wherein the predetermined still image data compression standard is JPEG and a plurality of JPEG files are generated.

3. The method of claim 1 wherein the predetermined motion image data compression standard is MPEG.

4. The method of claim 1 wherein the still image data compression is performed with a hardware JPEG file conversion component.

5. The method of claim 2 wherein the JPEG files are embedded in a plurality of corresponding EXIF files.

6. The method of claim 1 wherein the sequence of low resolution images is taken at a rate sufficient to ensure substantially non jerky motion when the motion video sequence is replayed.

7. The method of claim 6 wherein the rate is approximately thirty frames per second.

8. The method of claim 1 and further comprising the step of selectively displaying selected ones of the high resolution still images or the motion video sequence.

9. A camera, comprising:
   an image sensor mounted in a housing for receiving light and generating output signals representative of an image;
   a shutter button mounted to the housing;
   a circuit for processing the output signals in response to actuation of the shutter button; and
   a control circuit connected to the processing circuit for selectively generating a first sequence of high resolution still image files in response to momentary actuation of a shutter button or a second sequence of low resolution still image files in response to actuation of the shutter button for a duration longer than a momentary actuation and for executing firmware to convert the second sequence into a motion video sequence.

10. The camera of claim 9 wherein the still image files are generated in accordance with a predetermined still image data compression standard and the second sequence of low resolution still image files are converted into a motion video sequence in accordance with a predetermined motion image data compression standard.

11. The camera of claim 9 wherein the control circuit includes means for permitting a user to selectively observe on a display selected ones of the high resolution still image files or the motion video sequence.

12. The camera of claim 9 wherein the control circuit causes a markup file to be generated in response to user commands.

* * * * *

UNITED STATES PATENT AND TRADEMARK OFFICE
CERTIFICATE OF CORRECTION

| | | |
|---|---|---|
| PATENT NO. | : 7,768,552 B1 | Page 1 of 1 |
| APPLICATION NO. | : 09/360419 | |
| DATED | : August 3, 2010 | |
| INVENTOR(S) | : Amir Doron | |

It is certified that error appears in the above-identified patent and that said Letters Patent is hereby corrected as shown below:

In column 2, lines 41-52, below "video sequence." delete "The method of the present invention involves selectively generating a first sequence of high resolution still image files or a second sequence of low resolution still image files and storing the image files in the memory in accordance with a predetermined still image data compression standard. The method further involves selectively retrieving the low resolution image files from the memory. The method further involves converting the low resolution image files to a motion video sequence in accordance with a predetermined motion image data compression standard, the conversion being performed with firmware, and storing the motion video sequence for later display.".

In column 9, line 10, in Claim 6, delete "non jerky" and insert -- non-jerky --, therefor.

Signed and Sealed this

Fifteenth Day of February, 2011

David J. Kappos
*Director of the United States Patent and Trademark Office*